United States Patent
Lacy (10) Patent No.: US 9,567,859 B2
(45) Date of Patent: Feb. 14, 2017

(54) COOLING PASSAGES FOR TURBINE BUCKETS OF A GAS TURBINE ENGINE

(71) Applicant: General Electric Company, Schenectady, NY (US)

(72) Inventor: Benjamin Paul Lacy, Greer, SC (US)

(73) Assignee: General Electric Company, Schenectady, NY (US)

( * ) Notice: Subject to any disclaimer, the term of this patent is extended or adjusted under 35 U.S.C. 154(b) by 1069 days.

(21) Appl. No.: 13/804,159

(22) Filed: Mar. 14, 2013

(65) Prior Publication Data

US 2014/0286771 A1 Sep. 25, 2014

(51) Int. Cl.
*F01D 5/18* (2006.01)
*F01D 9/06* (2006.01)
*B23P 15/04* (2006.01)

(52) U.S. Cl.
CPC ............. *F01D 5/187* (2013.01); *B23P 15/04* (2013.01); *F01D 9/06* (2013.01); *F05D 2250/323* (2013.01); *F05D 2260/20* (2013.01)

(58) Field of Classification Search
CPC ........ F01D 9/06; F01D 9/065; F05D 2260/20; F05D 2250/323; Y10T 29/49341; Y10T 29/49343; B23P 15/04
USPC .............................. 416/90 R, 92; 29/889.722
See application file for complete search history.

(56) References Cited

U.S. PATENT DOCUMENTS

| | | | | |
|---|---|---|---|---|
| 3,656,863 A * | 4/1972 | De Feo | ................... | F01D 5/183 416/193 R |
| 3,700,348 A * | 10/1972 | Corsmeier | .............. | F01D 5/189 416/231 R |
| 4,376,004 A * | 3/1983 | Bratton | ................... | F01D 5/184 156/89.27 |
| 6,152,694 A * | 11/2000 | Ai | ........................... | F01D 5/225 416/191 |
| 6,214,248 B1 * | 4/2001 | Browning | ............... | B23P 15/04 216/17 |
| 6,321,449 B2 * | 11/2001 | Zhao | ...................... | B21D 53/00 29/890.01 |
| 6,461,108 B1 | 10/2002 | Lee et al. | | |
| 6,528,118 B2 | 3/2003 | Lee et al. | | |
| 7,029,235 B2 * | 4/2006 | Liang | ........................ | F01D 5/18 416/232 |
| 7,487,641 B2 | 2/2009 | Frechette et al. | | |
| 7,549,843 B2 * | 6/2009 | Liang | ..................... | F01D 5/186 415/115 |
| 7,900,458 B2 | 3/2011 | James et al. | | |
| 2002/0106457 A1 | 8/2002 | Lee et al. | | |
| 2011/0223004 A1 | 9/2011 | Lacy et al. | | |

* cited by examiner

*Primary Examiner* — Bryan Lettman
*Assistant Examiner* — Timothy P Solak
(74) *Attorney, Agent, or Firm* — Sutherland Asbill & Brennan LLP (57) ABSTRACT

A turbine bucket may include a platform, an airfoil extending radially from the platform, and a number of cooling passages defined within the airfoil and near an outer surface of the airfoil. Each of the cooling passages may include a radially inner portion having a first cross-sectional area and at least one radially outer portion having a second cross-sectional area, wherein the first cross-sectional area may be greater than the second cross-sectional area. A method of cooling a turbine bucket used in a gas turbine engine.

19 Claims, 6 Drawing Sheets

PRIOR ART

COOLING PASSAGES FOR TURBINE BUCKETS OF A GAS TURBINE ENGINE

TECHNICAL FIELD

The present application and the resultant patent relate generally to gas turbine engines and more particularly relate to cooling passages for turbine buckets of a gas turbine engine to provide improved cooling at high operating temperatures.

BACKGROUND OF THE INVENTION

In a gas turbine engine, hot combustion gases generally flow from one or more combustors through a transition piece and along a hot gas path. A number of turbine stages typically are disposed in series along the hot gas path so that the combustion gases flow through first-stage nozzles and buckets and subsequently through nozzles and buckets of later stages of the turbine. In this manner, the turbine buckets are subjected to high temperatures resulting from the combustion gases flowing along the hot gas path. Because the efficiency of a gas turbine engine is dependent on its operating temperatures, there is an ongoing demand for components positioned along the hot gas path, such as turbine buckets, to be capable of withstanding increasingly higher temperatures without failure or decrease in useful life.

Certain turbine buckets, particularly those of later turbine stages, may include a number of cooling holes extending radially through the turbine bucket. In this manner, the cooling holes may transport a cooling fluid, such as air, through the turbine bucket for exchanging heat in order to maintain the temperature of the turbine bucket within an acceptable range. According to one known cooling hole configuration, the turbine bucket may include a number of long, straight cooling holes formed by shaped-tube electrolytic machining, otherwise known as "STEM drilling." Although such configuration may provide adequate cooling of the turbine bucket in certain applications, cooling holes formed by conventional STEM drilling are limited to a straight path through the turbine bucket. Accordingly, the three-dimensional shape of the turbine bucket also is limited due to the need to accommodate the straight cooling holes extending radially therethrough. Moreover, the straight cooling holes formed by STEM drilling have a constant diameter and thus fail to address the variation in cooling needs along the radial length of the turbine bucket. Specifically, as a result of the constant diameter, an undesirable amount of heat may be transferred to the cooling fluid before it reaches a tip region of the turbine bucket where cooling needs are greater.

There is thus a desire for an improved turbine bucket having a cooling configuration for withstanding high temperatures along the hot gas path of a gas turbine engine. Specifically, such a cooling configuration may allow the turbine bucket to have various complex three-dimensional shapes or twist for improved aerodynamics. Such a cooling configuration also may address the variation in cooling needs along the radial length of the turbine bucket for efficient cooling. Ultimately, such a cooling configuration may decrease the amount of air flow required to cool the turbine bucket while increasing overall efficiency of the gas turbine engine.

SUMMARY OF THE INVENTION

The present application and the resultant patent thus provide a turbine bucket for a gas turbine engine. The turbine bucket may include a platform, an airfoil extending radially from the platform, and a number of cooling passages defined within the airfoil and near an outer surface of the airfoil. Each of the cooling passages may include a radially inner portion having a first cross-sectional area and at least one radially outer portion having a second cross-sectional area, wherein the first cross-sectional area may be greater than the second cross-sectional area.

The present application and the resultant patent further provide a method of cooling a turbine bucket used in a gas turbine engine. The method may include the steps of directing a flow of cooling fluid into at least one feed passage defined within a shank of the turbine bucket, passing the flow of cooling fluid through a number of cooling passages defined within an airfoil of the turbine bucket and near an outer surface of the airfoil, and directing the flow of cooling fluid out of the turbine bucket and into a hot gas path of the gas turbine engine. Each of the cooling passages may include a radially inner portion having a first cross-sectional area and at least one radially outer portion having a second cross-sectional area, wherein the first cross-sectional area may be greater than the second cross-sectional area.

The present application and the resultant patent further provide a turbine bucket for a gas turbine engine. The turbine bucket may include a platform, an airfoil extending radially from the platform to a tip end of the turbine bucket, and a shank extending radially from the platform to a root end of the turbine bucket. The turbine bucket also may include a number of cooling passages defined within the airfoil and near an outer surface of the airfoil. Each of the cooling passages may include a radially inner portion having a first cross-sectional area and at least one radially outer portion having a second cross-sectional area, wherein the first cross-sectional area may be greater than the second cross-sectional area. The turbine bucket further may include at least one feed passage defined within the shank, wherein the feed passage may be in communication with at least one of the cooling passages at an interface. The feed passage may have a fourth cross-sectional area, wherein the fourth cross-sectional area may be greater than the first cross-sectional area.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
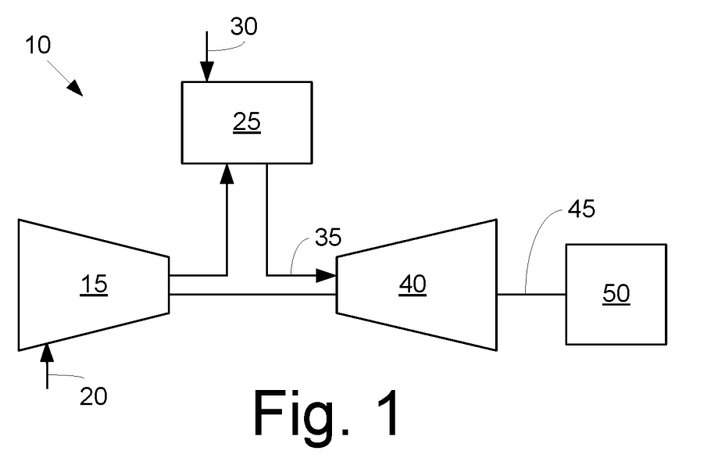
FIG. 1 is a schematic diagram of a gas turbine engine including a compressor, a combustor, and a turbine.

Referring now to the drawings, in which like numerals refer to like elements throughout the several views, FIG. 1 shows a schematic view of a gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like. Other configurations and other components may be used herein.

The gas turbine engine 10 may use natural gas, various types of syngas, and/or other types of fuels. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together. Although the gas turbine engine 10 is shown herein, the present application may be applicable to any type of turbo machinery.

Figure 2:
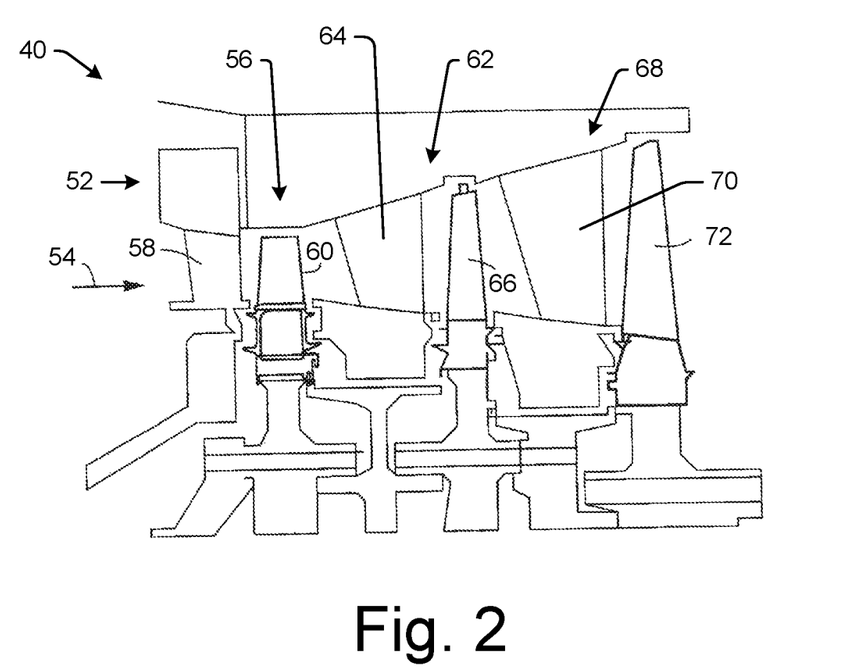
FIG. 2 is a schematic diagram of a portion of a turbine as may be used in the gas turbine engine of FIG. 1, showing a number of turbine stages.

FIG. 2 shows a schematic view of a portion of the turbine 40 including a number of stages 52 positioned in a hot gas path 54 of the gas turbine engine 10. A first stage 56 may include a number of circumferentially-spaced first-stage nozzles 58 and buckets 60. Likewise, a second stage 62 may include a number of circumferentially-spaced second-stage nozzles 64 and buckets 66. Further, a third stage 68 may include a number of circumferentially-spaced third-stage nozzles 70 and buckets 72. Although the portion of the turbine 40 is shown as including three stages 52, the turbine 40 may include any number of stages 52.

Figure 3:
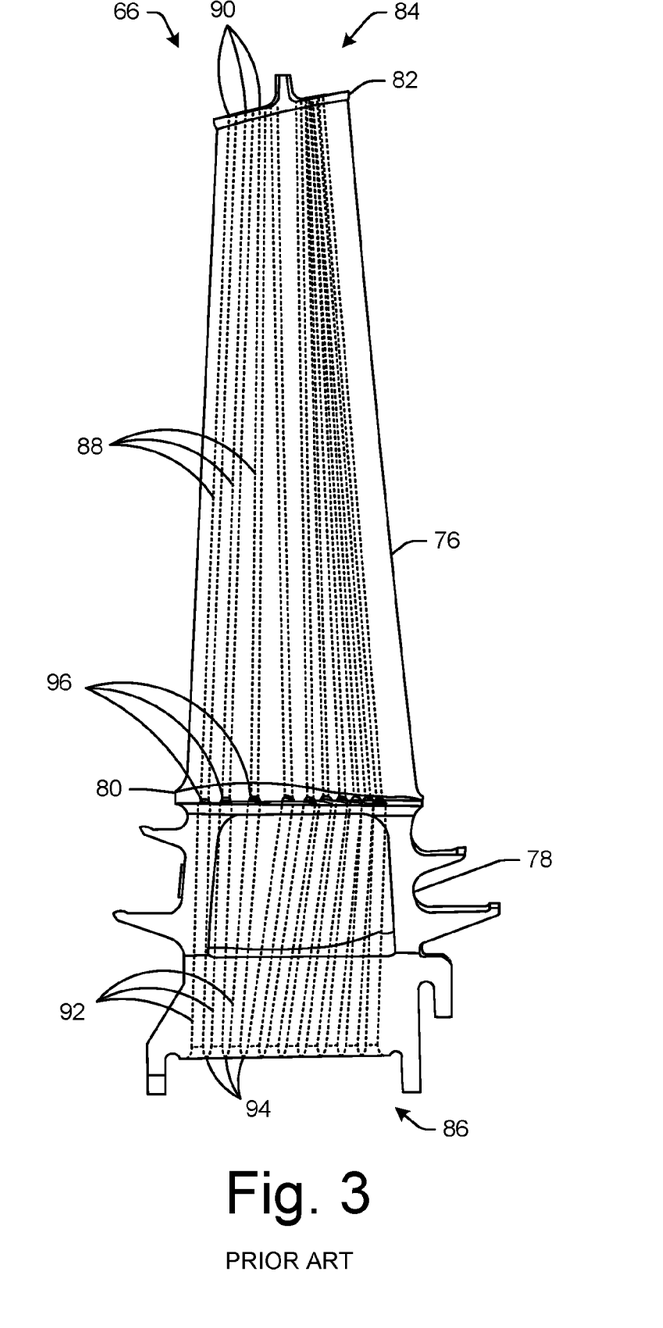
FIG. 3 is a front plan view of a known turbine bucket as may be used in the turbine of FIG. 2, showing a number of cooling holes illustrated by hidden lines.

FIG. 3 shows a front plan view of one of the buckets 66 of the second stage 62 of the turbine 40. As is known, the bucket 66 may include an airfoil 76, a shank 78, and a platform 80 disposed between the airfoil 76 and the shank 78. The airfoil 76 may extend radially upward from the platform 80 to a tip shroud 82 positioned about a tip end 84 of the bucket 66. The tip shroud 82 may be integrally formed with the airfoil 76. The shank 78 may extend radially downward from the platform 80 to a root end 86 of the bucket 66, such that the platform 80 generally defines an interface between the airfoil 76 and the shank 78. As is shown, the platform 80 may be formed so as to be substantially planar and to be generally horizontal when the bucket 66 is positioned within the turbine 40 for use. The shank 78 may be formed to define a root structure, such as a dovetail, configured to secure the bucket 66 to a turbine disk of the turbine 40. During operation of the gas turbine engine 10, the flow of combustion gases 35 travels along the hot gas path 54 and over the platform 80, which forms the radially inner boundary of the hot gas path 54. Accordingly, the flow of combustion gases 35 is directed against the airfoil 76 of the bucket 66, and thus the surfaces of the airfoil 76 are subjected to very high temperatures.

Figure 4:
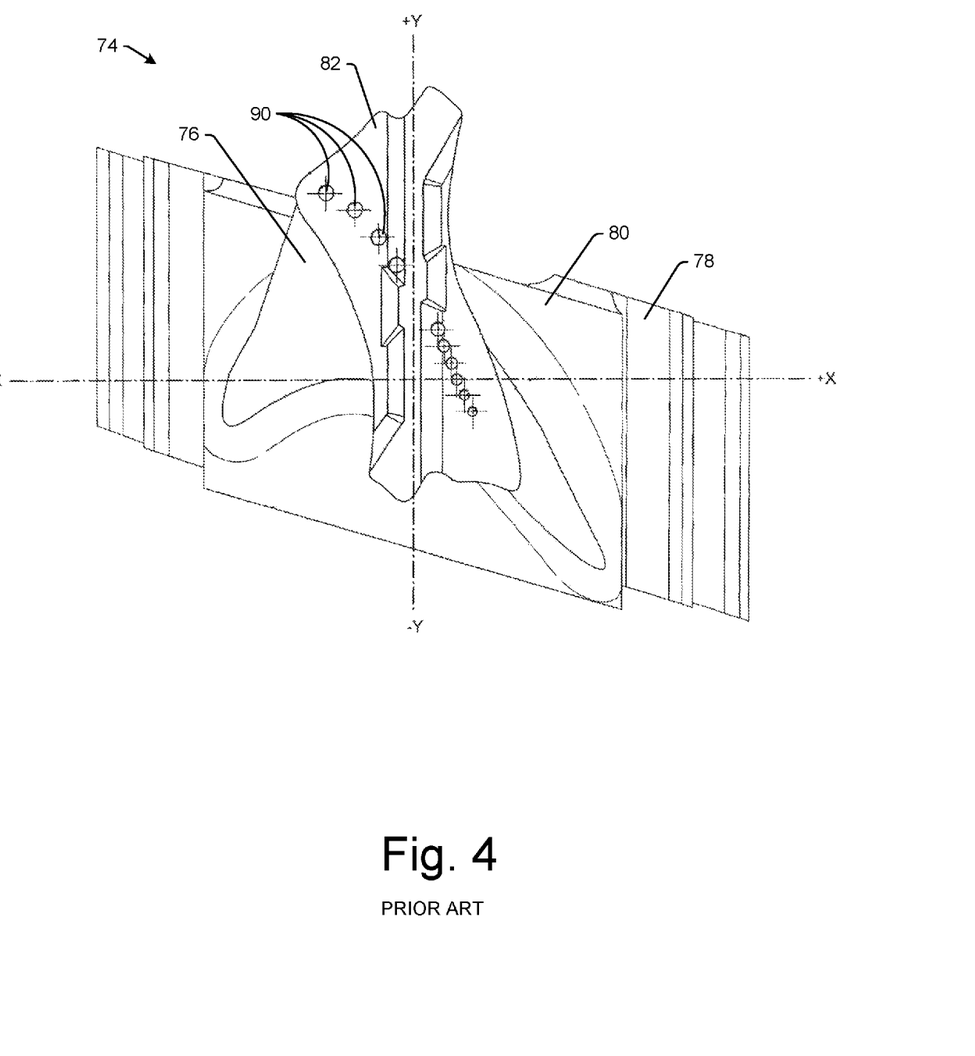
FIG. 4 is a top plan view of the turbine bucket of FIG. 3.

As is shown in FIGS. 3 and 4, the bucket 66 may include a number of cooling holes 88 (illustrated via hidden lines) defined within the airfoil 76. Each cooling hole 88 may extend radially from the platform 80 to an outlet 90 defined in the tip shroud 82 at the tip end 84 of the bucket 66. The cooling holes 88 may be formed by conventional STEM drilling, and thus they have a generally circular cross-sectional shape and a constant diameter along the length of the cooling holes 88. The bucket 66 also may include a number of feed holes 92 (illustrated via hidden lines) defined within the shank 78. Each feed hole 92 may extend radially from an inlet 94 defined in the shank 78 at the root end 86 of the bucket 66 to the platform 80. As is shown, each feed hole 92 may be in direct communication with one of the cooling holes 88 at an interface 96 positioned within the platform 80. The feed holes 92 also may be formed by conventional STEM drilling, and thus they have a generally circular cross-sectional shape and a constant diameter along the length of the feed holes 92. During operation of the gas turbine engine 10, a cooling fluid, such as bleed air from the compressor 15, may be directed into the feed holes 92 via the inlets 94 and subsequently may pass through the cooling holes 88 and exit the bucket 66 via the outlets 90. Accordingly, heat may transfer from the bucket 66, and in particular the airfoil 76, to the cooling fluid as it passes through the cooling holes 88 and then is directed into the hot gas path 54 at the tip end 84 of the bucket 66.

Figure 5:
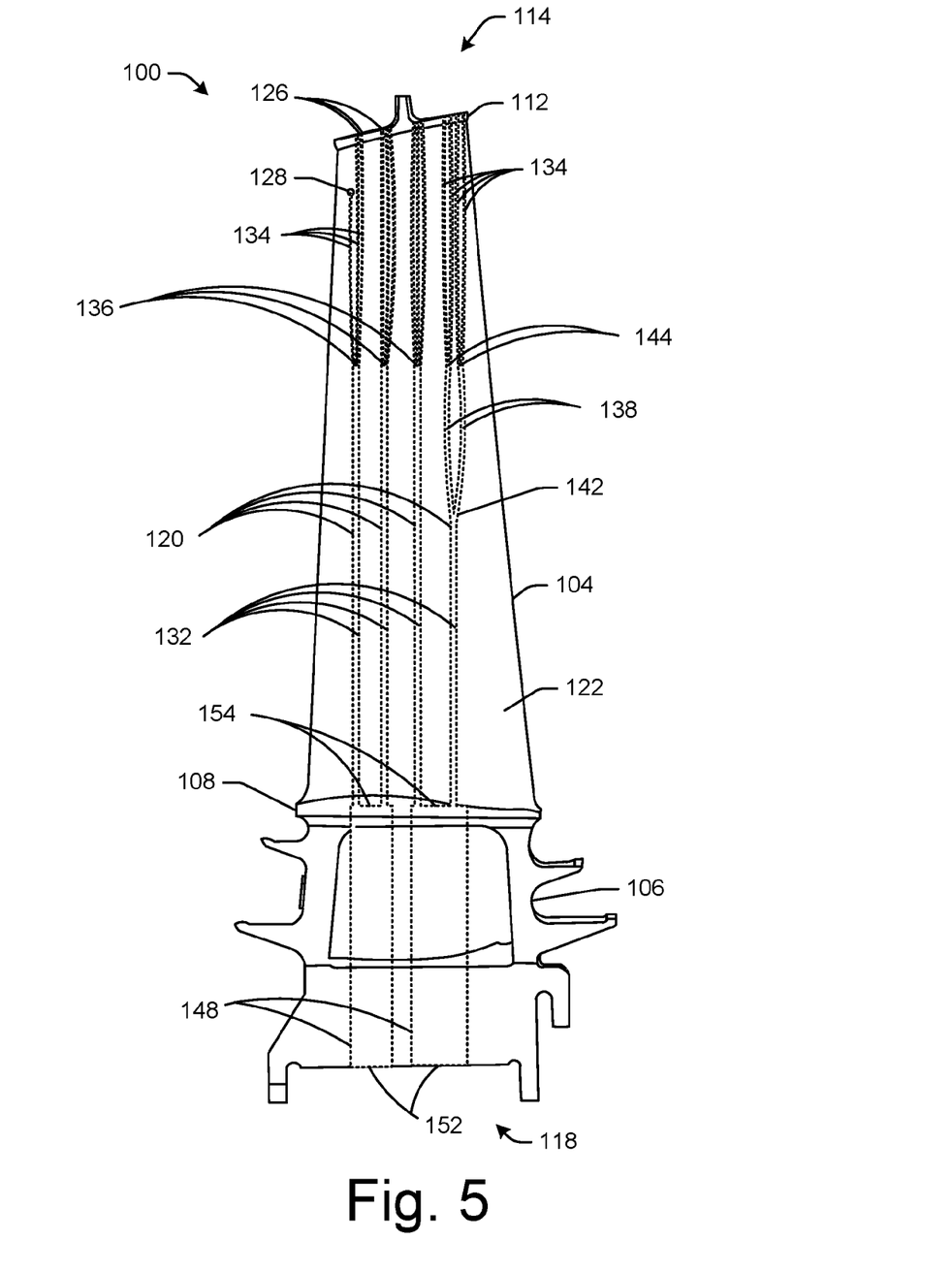
FIG. 5 is a front plan view of one embodiment of a turbine bucket as may be described herein, showing a number of cooling passages illustrated by hidden lines.

FIG. 5 shows a front plan view of one embodiment of a turbine bucket 100 as may be described herein. The bucket 100 may be used in a later stage, such as the second stage 62, of the turbine 40 of the gas turbine engine 10. In a similar manner, the bucket 100 may be used in the third stage 68 or any other stage of the turbine 40. The bucket 100 may include an airfoil 104, a shank 106, and a platform 108 disposed between the airfoil 104 and the shank 106. The airfoil 104 may extend radially upward from the platform 108 to a tip shroud 112 positioned about a tip end 114 of the bucket 100. The tip shroud 112 may be integrally formed with the airfoil 104. The shank 106 may extend radially downward from the platform 108 to a root end 118 of the bucket 100, such that the platform 108 generally defines an interface between the airfoil 104 and the shank 106. As is shown, the platform 108 may be formed so as to be substantially planar and to be generally horizontal when the bucket 100 is positioned within the turbine 40 for use. The shank 106 may be formed to define a root structure, such as a dovetail, configured to secure the bucket 100 to a turbine disk of the turbine 40. Other configurations of the airfoil 104, the shank 106, and the platform 108 may be used.

As is shown in FIG. 5, the bucket 100 may include a number of cooling passages 120 (illustrated via hidden lines) defined within the airfoil 104 near an outer surface 122 of the airfoil 104. The cooling passages 120 may extend radially along the outer surface 122 of the airfoil 104 from the platform 108 toward the tip end 114 of the bucket 100. Specifically, one or more of the cooling passages 120 each may extend radially along the outer surface 122 of the airfoil 104 from the platform 108 to one or more outlets 126 defined in the tip shroud 112 at the tip end 114 of the bucket 100. Additionally, one or more of the cooling passages 120 each may extend radially along the outer surface 122 of the airfoil 104 from the platform 108 to one or more outlets 128 defined in the outer surface 122 of the airfoil 104 and positioned radially between the platform 108 and the tip shroud 112. In like manner, one or more of the cooling passages 120 each may extend radially along the outer surface 122 of the airfoil 104 from the platform 108 to one or more outlets defined anywhere along the bucket 100. For example, in certain aspects, one or more of the cooling passages 120 each may extend radially to one or more outlets defined by one or more thru holes positioned along the airfoil 104. In some aspects, one or more of the cooling passages 120 each may extend radially along the outer surface 122 of the airfoil 104 and follow the contour of the outer surface 122 of the airfoil 104. In other aspects, one or more of the cooling passages 120 each may extend axially along the outer surface 122 of the airfoil 104 to one or more outlets defined in the airfoil 104. For example, in certain aspects, one or more of the cooling passages 120 each may extend axially to one or more outlets defined by one or more thru holes positioned along the airfoil 104. In still other aspects, one or more of the cooling passages 120 each may turn axially or form a serpentine pattern or any other pattern to optimize cooling of the bucket 100. In such aspects, one or more of the cooling passages 120 each may extend to one or more outlets defined by one or more thru holes positioned along the trailing edge of the airfoil 104.

One or more of the cooling passages 120 each may have a cross-sectional area that varies along the radial length of the cooling passage 120. The cross-sectional area of the cooling passage 120 may vary gradually in a tapered manner along the radial length of the cooling passage 120. Alternatively, the cross-sectional area of the cooling passage 120 may vary abruptly in a stepped manner along the radial length of the cooling passage, as is shown in FIG. 5. Specifically, one or more of the cooling passages 120 may have a cross-sectional area near the platform 108 that is greater than a cross-sectional area of the cooling passage 120 near the tip end 114 of the bucket 100.

In some aspects, one or more of the cooling passages 120 each may include a radially inner portion 132 having a first cross-sectional area that is constant along the radial length of the radially inner portion 132, and a radially outer portion 134 having a second cross-sectional area that is constant along the radial length of the radially outer portion 134. In such aspects, the first cross-sectional area may be greater than the second cross-sectional area. The radially inner portion 132 may be in direct communication with the radially outer portion 134 at an interface 136 positioned between the platform 108 and the tip end 114 of the bucket 100. Alternatively, one or more of the cooling passages 120 each may include a radially intermediate portion 138 positioned between the radially inner portion 132 and the radially outer portion 134. In certain aspects, the radially intermediate portion 138 may have a third cross-sectional area that is constant along the radial length of the radially intermediate portion 138. In such aspects, the third cross-sectional area may be less than the first cross-sectional area and greater than the second cross-sectional area. The radially intermediate portion 138 may be in direct communication with the radially inner portion 132 at an interface 142 and in direct communication with the radially outer portion 134 at an interface 144. As is shown, each of the interfaces 136, 142, 144 between the different portions 132, 134, 138 may include a stepped transition from one cross-sectional area to another. Alternatively, each of the interfaces 136, 142, 144 between the different portions 132, 134, 138 may include a tapered transition from one cross-sectional area to another. Other configurations may be used in which one or more of the cooling passages 120 each may include additional radially-spaced intermediate portions positioned between the radially inner portion 132 and the radially outer portion 134, wherein each additional radially-spaced intermediate portion has a distinct and different cross-sectional area.

As is shown in FIG. 5, one or more of the cooling passages 120 each may include a number of radially outer portions 134 in direct communication with the radially inner portion 132 at the interface 136. In this manner, the cooling passage 120 defines a tree-like shape whereby the radially outer portions 134 branch off from the radially inner portion 132 at the interface 136. In certain aspects, the first cross-sectional area of the radially inner portion 132 may be greater than the second cross-sectional area of each of the radially outer portions 134. In like manner, one or more of the cooling passages 120 each may include a number of radially intermediate portions 138 in direct communication with the radially inner portion 132 at the interface 142, forming a branched tree-like shape. In some aspects, the first cross-sectional area of the radially inner portion 132 may be greater than the third cross-sectional area of each of the radially intermediate portions 138. Furthermore, one or more of the cooling passages 120 each may include a number of radially outer portions 134 in direct communication with one of the radially intermediate portions 138 at the interface 144, also forming a branched tree-like shape. In certain aspects, the third cross-sectional area of the radially intermediate portion 138 may be greater than the second cross-sectional area of each of the radially outer portions 134. Other configurations may be used in which one or more of the cooling passages 120 each may include additional radially-spaced intermediate portions positioned between the radially inner portion 132 and the radially outer portion 134, wherein each additional radially-spaced intermediate portion has a distinct and different cross-sectional area.

The bucket 100 also may include one or more feed passages 148 (illustrated via hidden lines) defined within the bucket 100. As is shown in FIG. 5, the one or more feed passages 148 each may extend radially from an inlet 152 defined in the shank 106 at the root end 118 of the bucket 100 to the platform 108. The one or more feed passages 148 each may be in direct communication with one or more of the cooling passages 120 at an interface 154 positioned within the platform 108. Specifically, the one or more feed passages 148 each may be in direct communication with one or more of the radially inner portions 132 at the interface 154. In some aspects, the one or more feed passages 148 each may have a fourth cross-sectional area that is constant along the radial length of the feed passage 148. In such aspects, the fourth cross-sectional area may be greater than the first cross-sectional area of each of the one or more radially inner portions 132.

Figure 6:
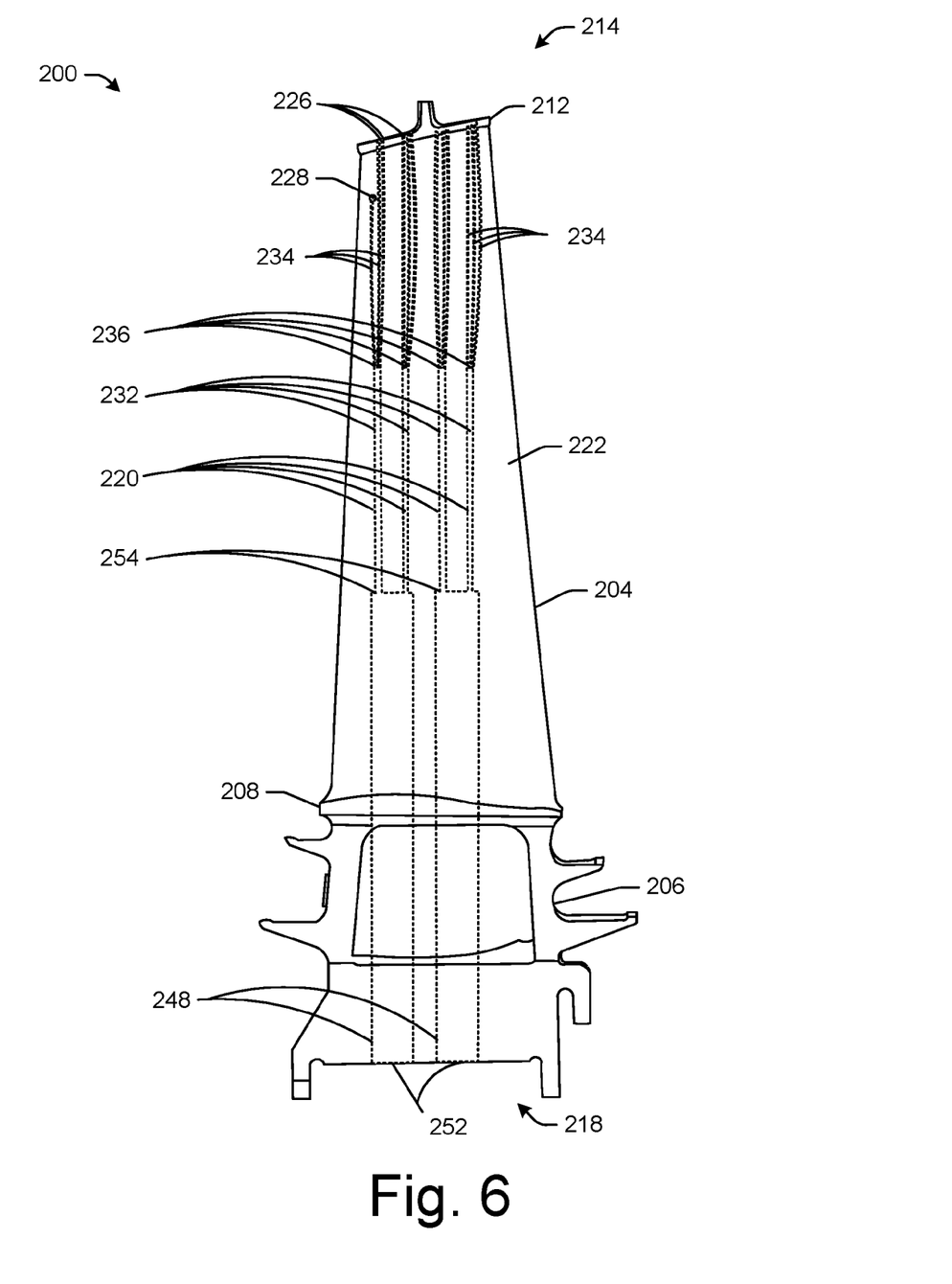
FIG. 6 is a front plan view of another embodiment of a turbine bucket as may be described herein, showing a number of cooling passages illustrated by hidden lines.

FIG. 6 shows a front plan view of another embodiment of a turbine bucket 200 as may be described herein. The bucket 200 includes various elements corresponding to those described above with respect to bucket 100, which elements are identified in FIG. 6 with corresponding numerals and are not described in further detail herein. The bucket 200 may be used in a later stage, such as the second stage 62, of the turbine 40 of the gas turbine engine 10. In a similar manner, the bucket 200 may be used in the third stage 68 or any other stage of the turbine 40.

As is shown in FIG. 6, the bucket 200 may include a number of cooling passages 220 (illustrated via hidden lines) defined within the airfoil 204 near the outer surface 222 of the airfoil 204. The cooling passages 220 may extend radially along the outer surface 222 of the airfoil 204 from a position near the platform 208 toward the tip end 214 of the bucket 200. Specifically, one or more of the cooling passages 220 each may extend radially along the outer surface 222 of the airfoil 204 from the position near the platform 208 to one or more outlets 226 defined in a tip shroud 212 at the tip end 214 of the bucket 200. Additionally, one or more of the cooling passages 220 each may extend radially along the outer surface 222 of the airfoil 204 from the position near the platform 208 to one or more outlets 228 defined in the outer surface 222 of the airfoil 204 and positioned radially between the platform 208 and the tip shroud 212. In some aspects, one or more of the cooling passages 220 may include one or more radially inner portions 232 and one or more radially outer portions 234 corresponding to the elements described above with respect to bucket 100. In like manner, one or more of the cooling passages 220 each may extend radially along the outer surface 222 of the airfoil 204 from the platform 208 to one or more outlets defined anywhere along the bucket 200. In some aspects, one or more of the cooling passages 220 each may extend radially along the outer surface 222 of the airfoil 204 and follow the contour of the outer surface 222 of the airfoil 204. In other aspects, one or more of the cooling passages 220 each may extend axially along the outer surface 222 of the airfoil 204. For example, in certain aspects, one or more of the cooling passages 220 each may extend axially to one or more outlets defined by one or more thru holes positioned along the airfoil 204. In still other aspects, one or more of the cooling passages 220 each may turn axially or form a serpentine pattern or any other pattern to optimize cooling of the bucket 200. In such aspects, one or more of the cooling passages 220 each may extend to one or more outlets defined by one or more thru holes positioned along the trailing edge of the airfoil 204.

The bucket 200 also may include one or more feed passages 248 (illustrated via hidden lines) defined within the bucket 200. As is shown in FIG. 6, the one or more feed passages 248 each may extend radially from an inlet 252 defined in the shank 206 at the root end 218 of the bucket 200 to the position near the platform 208. In this manner, the one or more feed passages 248 each may extend through the shank 206 and into the airfoil 204. The one or more feed passages 248 each may be in direct communication with one or more of the cooling passages 220 at an interface 254 positioned within the airfoil 204. Specifically, the one or more feed passages 248 each may be in direct communication with one or more of the radially inner portions 232 at the interface 254. In some aspects, the one or more feed passages 248 each may have a fourth cross-sectional area that is constant along the radial length of the feed passage 248. In such aspects, the fourth cross-sectional area may be greater that the first cross-sectional area of each of the one or more radially inner portions 232. Other configurations may be used in which one or more of the cooling passages 120 each may include additional radially-spaced intermediate portions positioned between the radially inner portion 232 and the radially outer portion 234, wherein each additional radially-spaced intermediate portion has a distinct and different cross-sectional area.

Figure 7:
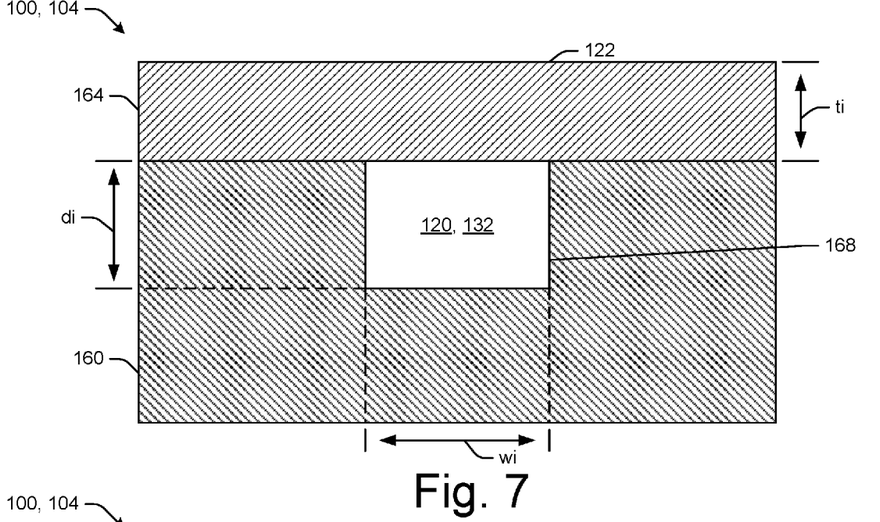
FIG. 7 is a top cross-sectional view of a portion of a turbine bucket as may be described herein, showing a cooling passage defined in the turbine bucket.

FIG. 7 shows a top cross-sectional view of a portion of the turbine bucket 100 along the outer surface 122 of the airfoil 104, illustrating the structure of one of the radially inner portions 132 of one of the cooling passages 120. The airfoil 104 may include a base portion 160 and a cover layer 164 extending over the base portion 160. In this manner, the cover layer 164 forms the outer surface 122 of the airfoil 104. As is shown, the cooling passage 120 may be defined by the base portion 160 and the cover layer 164 of the airfoil 104. Specifically, the cooling passage 120 may be defined by a channel 168 formed in the base portion 160 and over which the cover layer 164 extends. The channel 168 may have a generally rectangular-shaped cross section, as is shown, although the channel 168 alternatively may be formed to have a cross section of other shapes. Additionally, the channel 168 may include rounded corners. Along the radially inner portion 132 of the cooling passage 120, the channel 168 may have a width $w_i$ and a depth $d_i$. Moreover, along the radially inner portion 132 of the cooling passage 120, the cover layer 164 may have a thickness $t_i$. The thickness $t_i$ may remain constant along the radial length of the radially inner portion 132, resulting in a constant distance between the channel 168 and the outer surface 122 of the airfoil 104. Alternatively, the thickness $t_i$ may vary along the radial length of the radially inner portion 132, resulting in a varying distance between the channel 168 and the outer surface 122 of the airfoil 104. Although the size of the nominal diameter of the cooling passage 120 may be within a wide range of sizes, in certain embodiments, the nominal diameter preferably may be within 0.010 inches and 0.300 inches. Additionally, the cooling passages 120 may have a pitch to nominal diameter ratio that may be greater than 1 for larger cooling passages 120, and that may be between 3 and 10 for smaller cooling passages 120.

Figure 8:
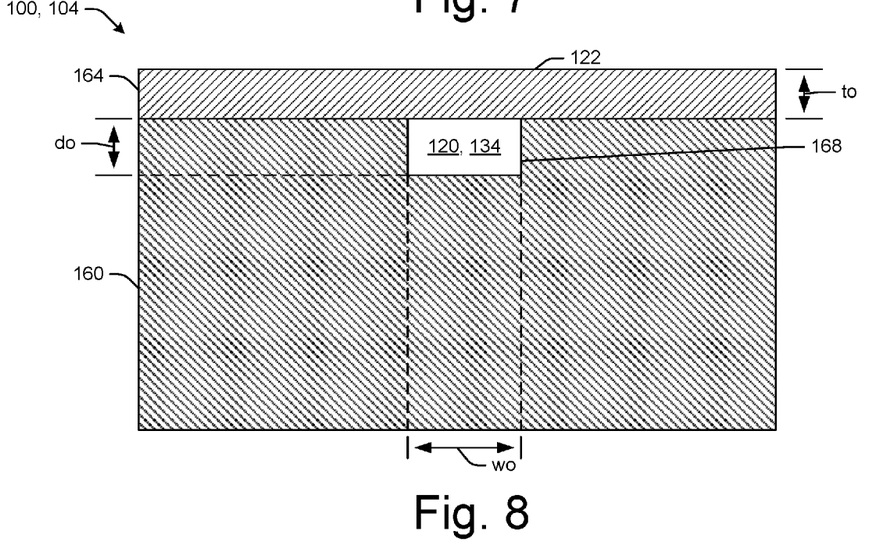
FIG. 8 is a top cross-sectional view of a portion of a turbine bucket as may be described herein, showing a cooling passage defined in the turbine bucket.

FIG. 8 shows a top cross-sectional view of a portion of the turbine bucket 100 along the outer surface 122 of the airfoil 104, illustrating the structure of one of the radially outer portions 134 of one of the cooling passages 120. Along the radially outer portion 134 of the cooling passage 120, the channel 168 may have a width $w_o$ and a depth $d_o$. Moreover, along the radially outer portion 134 of the cooling passage 120, the cover layer 164 may have a thickness $t_o$. The thickness $t_o$ may remain constant along the radial length of the radially outer portion 134, resulting in a constant distance between the channel 168 and the outer surface 122 of the airfoil 104. Alternatively, the thickness $t_o$ may vary along the radial length of the radially outer portion 134, resulting in a varying distance between the channel 168 and the outer surface 122 of the airfoil 104. As described above, the first cross-sectional area of the radially inner portion 132 of the cooling passage 120 may be greater than the second cross-sectional area of the radially outer portion 134 of the cooling passage 120. Additionally, the thickness $t_i$ of the radially inner portion 132 of the cooling passage 120 may be greater than the thickness $t_o$ of the radially outer portion 134 of the cooling passage 120. As noted above, although the size of the nominal diameter of the cooling passage 120 may be within a wide range of sizes, in certain embodiments, the nominal diameter preferably may be within 0.010 inches and 0.300 inches. Additionally, the cooling passages 120 may have a pitch to nominal diameter ratio that may be greater than 1 for larger cooling passages 120, and that may be between 3 and 10 for smaller cooling passages 120.

The cooling passages 120 of the turbine bucket 100 may be formed by a variety of methods. In certain aspects, the channel 168 of the cooling passage 120 may be formed in the base portion 160 of the airfoil 104 by milling, wire EDM, milled EDM, plunge EDM, waterjet trenching, laser trenching, or casting. Other methods of forming the channel 168 may be used. After forming the channel 168, the cover layer 164 may be formed over the channel 168 in a manner that causes the cover layer 164 to tightly adhere to the base portion 160. In some aspects, the cover layer 164 may include a thin foil or sheet that is brazed or welded to the base portion 160. In other aspects, the cover layer 164 may include a spray coat that bridges the channel 168 and bonds to the base portion 160. Other methods of forming the cover layer 164 may be used. In certain aspects, the outlet 126, 128 of the cooling channel 120 may be formed by drilling, waterjet trenching, or laser trenching. Other methods of forming the outlet 126, 128 may be used. The feed passages 148 of the turbine bucket 100 also may be formed by a variety of methods. In certain aspects, the feed passages 148 may be formed in the shank 106 and the platform 108 by drilling, STEM drilling, milling, wire EDM, milled EDM, plunge EDM, waterjet trenching, laser trenching, or casting. Other methods of forming the feed passages 148 may be used. Any combination of the above methods may be used to form the different cooling passages 120, outlets 126, 128, and feed passages 148.

During operation of the gas turbine engine 10 including the turbine bucket 100, a cooling fluid, such as bleed air from the compressor 15, may be directed into the feed passages 148 via the inlets 152. The cooling fluid subsequently may pass through the cooling passages 120 and exit the bucket 100 via the outlets 126, 128. Accordingly, heat may transfer from the bucket 100, and in particular the airfoil 104, to the cooling fluid as it passes through the cooling passages 120 and then is directed into the hot gas path 54 at the tip end 114 of the bucket 100. Within the cooling passages 120, the cooling fluid may pass through the radially inner portions 132 and the radially outer portions 134, which may allow heat to transfer from the bucket 100 to the cooling fluid at different rates.

The radially inner portions 132 and the radially outer portions 134 of the cooling holes 120 may be configured to optimize heat transfer from the bucket 100, and in particular the airfoil 104, to the cooling fluid. Because cooling needs are greater toward the tip end 114 of the bucket 100, the first cross-sectional area of each of the radially inner portions 132 may be greater than the second cross-sectional area of each of the radially outer portions 134. Consequently, heat transfer between the cooling fluid and the bucket 100 may be minimized along the radially inner portions 132. In like manner, the fourth cross-sectional area of each of the feed passages 148 may be greater than the first cross-sectional area of each of the radially inner portions 132 to minimize heat transfer between the cooling fluid and the bucket 100 along the feed passages 148. Additionally, the cover layer 164 may have a first thickness $t_i$ over the radially inner portions 132 and a second thickness $t_o$ over the radially outer portions 134. The first thickness $t_i$ may be greater than the second thickness $t_o$ to further minimize heat transfer between the cooling fluid and the bucket 100 along the radially inner portions 132. As noted above, one or more of the first thickness $t_i$ and the second thickness $t_o$ may vary along the radial length of the respective radially inner portion 132 or radially outer portion 134.

The turbine bucket 100 described herein thus provides an improved cooling configuration for withstanding high temperatures along the hot gas path 54 of the gas turbine engine 10. The bucket 100 may include a number of cooling passages 120 each having a cross-sectional area that varies along the radial length of the cooling passage 120. Specifically, one or more of the cooling passages 120 may include one or more radially inner portions 132 having a first cross-sectional area and one or more radially outer portions 134 having a second cross-sectional area, configured so that the first cross-sectional area may be greater than the second cross-sectional area. In this manner, the cooling passages 120 may address the variation in cooling needs along the radial length of the bucket 100 for efficient cooling. Alternatively, one or more of the cooling passages 120 each may extend axially along the outer surface of the airfoil 104, may turn axially, or may form a serpentine pattern or any other pattern to optimize cooling of the bucket 100. Consequently, the cooling passages 120 may decrease the amount of air flow required to cool the bucket 100 while increasing overall efficiency of the gas turbine engine 10. Moreover, the cooling passages 120 may allow the bucket 100 to have various complex three-dimensional shapes or twist because the cooling passages 120 may be formed along the outer surface 122 of the airfoil 104. In this manner, the airfoil 104 may be configured for improved aerodynamics without concern for accommodating cooling holes having a straight trajectory.

Although the embodiments presented above are shown and described with respect to a bucket 100, 200, it should be understood that similar cooling passage 120, 220 configurations may be used on any component within or along the hot gas path of the gas turbine engine 10, such as a nozzle or a shroud. Moreover, although the embodiments presented above are shown and described with cooling passages 120, 220 extending radially along the bucket 100, 200, it should be understood that that the cooling passages 120, 220 may extend axially along the bucket, may turn axially, or may form a serpentine pattern or any other pattern or combination thereof to optimize cooling of the bucket 100, 200.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

I claim:

1. A turbine bucket for a gas turbine engine, the turbine bucket comprising:
   a platform;
   an airfoil extending radially from the platform, wherein the airfoil comprises a base portion and a cover layer extending over the base portion; and
   a plurality of cooling passages defined within the airfoil and near an outer surface of the airfoil, wherein each of the cooling passages is defined by a channel formed in the base portion and over which the cover layer extends, wherein each of the cooling passages comprises a radially inner portion having a first cross-sectional area in a direction transverse to a radial length of the radially inner portion and at least one radially outer portion having a second cross-sectional area in a direction transverse to a radial length of the radially outer portion, wherein the first cross-sectional area is greater than the second cross-sectional area, wherein the cover layer has a first thickness over the radially inner portion and a second thickness over the radially outer portion, and wherein the first thickness is greater than the second thickness.

2. The turbine bucket of claim 1, wherein at least one of the cooling passages comprises more than one radially outer portion.

3. The turbine bucket of claim 1, wherein at least one of the cooling passages comprises at least one radially intermediate portion extending between the radially inner portion and the at least one radially outer portion, wherein the at least one radially intermediate portion has a third cross-sectional area, and wherein the third cross-sectional area is greater than the second cross-sectional area and less than the first cross-sectional area.

4. The turbine bucket of claim 1, wherein the first cross-sectional area is constant along the radial length of the radially inner portion, and wherein the second cross-sectional area is constant along the radial length of the radially outer portion.

5. The turbine bucket of claim 1, wherein the first thickness is constant along the radial length of the radially inner portion, and wherein the second thickness is constant along the radial length of the radially outer portion.

6. The turbine bucket of claim 1, wherein the channel comprises a generally rectangular-shaped cross section.

7. The turbine bucket of claim 1, wherein at least one of the cooling passages extends radially along the outer surface of the airfoil from the platform to one or more outlets defined in a tip shroud of the turbine bucket.

8. The turbine bucket of claim 1, wherein at least one of the cooling passages extends radially along the outer surface of the airfoil from the platform to one or more outlets defined in the outer surface of the airfoil and positioned between the platform and a tip shroud of the turbine bucket.

9. The turbine bucket of claim 1, further comprising a shank extending radially from the platform and away from the airfoil, and at least one feed passage defined within the shank, wherein the feed passage is in communication with one or more of the cooling passages at an interface.

10. The turbine bucket of claim 9, wherein the feed passage is in direct communication with one or more of the radially inner portions at the interface, and wherein the interface is positioned within the platform.

11. The turbine bucket of claim 9, wherein the feed passage is in direct communication with one or more of the radially inner portions at the interface, and wherein the interface is positioned within the airfoil between the platform and a tip shroud of the turbine bucket.

12. The turbine bucket of claim 9, wherein the feed passage has a fourth cross-sectional area, and wherein the fourth cross-sectional area is greater than the first cross-sectional area.

13. A cooling system for a hot gas path surface of a gas turbine engine, the cooling system comprising:
a hot gas path component comprising a base portion and a cover layer extending over the base portion; and
a plurality of cooling passages defined within the hot gas path component and near an outer surface of the hot gas path component, wherein each of the cooling passages is defined by a channel formed in the base portion and over which the cover layer extends, wherein each of the cooling passages comprises a first portion having a first cross-sectional area in a direction transverse to a length of the first portion and at least one second portion having a second cross-sectional area in a direction transverse to a length of the second portion, wherein the at least one second portion extends from the first portion, wherein the first cross-sectional area is greater than the second cross-sectional area, wherein the cover layer has a first thickness over the first portion and a second thickness over the second portion, and wherein the first thickness is greater than the second thickness.

14. The cooling system of claim 13, wherein the cooling passages extend radially along the hot gas path component, wherein the first portion comprises a radially inner portion, and wherein the at least one second portion comprises at least one radially outer portion.

15. The cooling system of claim 13, wherein the hot gas path component is a nozzle, and wherein the cooling passages extend radially along the nozzle.

16. A method of cooling a turbine bucket used in a gas turbine engine, comprising:
directing a flow of cooling fluid into at least one feed passage defined within a shank of the turbine bucket;
passing the flow of cooling fluid through a plurality of cooling passages defined within an airfoil of the turbine bucket and near an outer surface of the airfoil, wherein the airfoil comprises a base portion and a cover layer extending over the base portion, wherein each of the cooling passages is defined by a channel formed in the base portion and over which the cover layer extends, wherein each of the cooling passages comprises a radially inner portion having a first cross-sectional area in a direction transverse to a radial length of the radially inner portion and at least one radially outer portion having a second cross-sectional area in a direction transverse to a radial length of the radially outer portion, wherein the first cross-sectional area is greater than the second cross-sectional area, wherein the cover layer has a first thickness over the radially inner portion and a second thickness over the radially outer portion, and wherein the first thickness is greater than the second thickness; and
directing the flow of cooling fluid out of the turbine bucket and into a hot gas path of the gas turbine engine.

17. The method of claim 16, wherein at least one of the cooling passages comprises more than one radially outer portion.

18. The method of claim 16, wherein the first cross-sectional area is constant along the radial length of the radially inner portion, wherein the second cross-sectional area is constant along the radial length of the radially outer portion, wherein the first thickness is constant along the radial length of the radially inner portion, and wherein the second thickness is constant along the radial length of the radially outer portion.

19. The method of claim 16, wherein at least one of the cooling passages extends radially along the outer surface of the airfoil from a platform of the turbine bucket to one or more outlets defined in a tip shroud of the turbine bucket.

* * * * *